United States Patent [19]

Erlandsson

[11] Patent Number: 4,728,242

[45] Date of Patent: Mar. 1, 1988

[54] VEHICLE RESTRAINT HAVING DOWNWARDLY FACING HOOK

[75] Inventor: Kjell I. Erlandsson, Milwaukee, Wis.

[73] Assignee: Kelley Company Inc., Milwaukee, Wis.

[21] Appl. No.: 851,970

[22] Filed: Apr. 14, 1986

[51] Int. Cl.[4] .............................................. B65G 67/02
[52] U.S. Cl. ...................................... 414/401; 14/71.1
[58] Field of Search ...................... 414/401, 396, 584; 14/71.1

[56] References Cited

U.S. PATENT DOCUMENTS

| | | | |
|---|---|---|---|
| 4,208,161 | 6/1980 | Hipp et al. | 414/401 |
| 4,264,259 | 4/1981 | Hipp | 414/401 |
| 4,267,748 | 5/1981 | Grunewald et al. | 74/529 |
| 4,282,621 | 8/1981 | Anthony | 14/71.1 |
| 4,373,847 | 2/1983 | Hipp et al. | 414/401 |
| 4,443,150 | 4/1984 | Hahn et al. | 414/401 |
| 4,472,099 | 9/1984 | Hahn et al. | 414/401 |
| 4,488,325 | 12/1984 | Bennett et al. | 14/71.3 |
| 4,553,895 | 11/1985 | Ellis | 414/401 |
| 4,560,315 | 12/1985 | Hahn | 414/401 |
| 4,589,813 | 5/1986 | Hagen et al. | 414/401 |
| 4,605,353 | 8/1986 | Hahn et al. | 414/401 |
| 4,664,582 | 5/1987 | Edmeads | 414/401 |

OTHER PUBLICATIONS

Photographs of vehicle restraint.

Primary Examiner—Robert J. Spar
Assistant Examiner—Stuart J. Millman
Attorney, Agent, or Firm—Andrus, Sceales, Starke & Sawall

[57] ABSTRACT

A vehicle restraint to prevent a truck, or other vehicle, from accidentally pulling away from a loading dock during a loading operation. The vehicle restraint includes a pair of spaced vertical guide tracks mounted on the front face of the dock and a slide is mounted for movement within the tracks. The slide has an extension that extends outwardly from the dock between the guide tracks and a restraining member, such as a hook, is pivotally connected to the extension about a generally vertical axis, so that the restraining member can be pivoted from a storage position, where the restraining member is generally parallel to the front face of the dock to an operating position where the restraining member extends outwardly from the dock. The restraining member is formed with a notch or recess in its lower surface, which is adapted to engage the ICC bar at the rear of the truck. In operation the restraining member is pivoted from the storage position to the operative position and dropped downwardly by gravity into engagement with the ICC bar to thereby prevent the truck from accidentally pulling away from the loading dock.

7 Claims, 3 Drawing Figures

VEHICLE RESTRAINT HAVING DOWNWARDLY FACING HOOK

BACKGROUND OF THE INVENTION

Vehicle restraints are commonly employed to prevent a truck from pulling away from a loading dock during a loading operation. A conventional vehicle restraint is mounted on the front face of the loading dock and includes a hook-like restraining member that is movable between a lower storage position and an upper operative position, where the restraining member engages the ICC bar at the rear end of the truck to prevent movement of the truck away from the dock. The ICC bar is a horizontal bar located at the rear of the truck beneath the truck bed, and is designed to prevent a vehicle from underriding the truck in the event of a rear end collision.

Certain types of vehicle restraints are moved manually by an operator from the lower storage position to the upper operative position, while in other types of vehicle restraints the hook or restraining member is power driven to the upper operative position and is either power driven downwardly to the storage position or is arranged to fall by gravity to the storage position.

While the most common types of vehicle restraints employ a hook-like member that is moved from a lower storage position to an upper operative position, vehicles restraints are also known which utilize a downwardly facing hook that is moved downwardly to the operative position. In this latter type the downwardly facing hook is secured to the upper end of a cylindrical rod and the rod is mounted for sliding movement between a pair of spaced guides mounted on the front face of the dock. For storage, the rod is rotated to pivot the hook to a position located generally parallel to the front face of the dock and the hook is retained in the upper storage position by engagement with the upper edge of the one of the guide tracks.

To move the hook to the operative position, the hook is pivoted 90° so that it extends outwardly from the dock and it is then permitted to fall by gravity between the spaced guide tracks into engagement with the ICC bar.

A vehicle restraint having a downwardly facing hook has the advantage that it is able to follow upward and downward float or movement of the truck bed during a loading operation without the need of biasing means.

However, it has been found that in certain situations where cargo is loaded on the truck bed, the truck bed may descend to a position where the hook cannot be moved upwardly and pivoted to its storage position, with the result that the hook cannot be released.

SUMMARY OF THE INVENTION

The invention is directed to a vehicle restraint having a downwardly facing hook that is moved downwardly into engagement with the abutment or ICC bar at the rear end of the truck or other vehicle.

In accordance with the invention, the vehicle restraint includes a pair of vertical guide tracks secured in spaced relation on the front face of the dock and a slide is mounted for movement within the tracks. A bar or extension extends outwardly from the slide between the tracks and a restraining member, which can be in the form of a downwardly facing hook, is pivotally connected to the extension about a generally vertical axis, so that the restraining member can be pivoted from a storage position where it is generally parallel to the front face of the dock, to an operating position where it extends outwardly from the dock. The lower surface of the restraining member is formed with a notch or recess bordered by a generally vertical shoulder which is adapted to engage the ICC bar when the restraining member is in the operating position.

In use, the hook or restraining member is normally located in the storage position where it is parallel to the front face of the dock and is held in this position by engagement with a stop or abutment attached to one of the guide tracks. After a truck has pulled up to the dock for a loading operation, an operator, standing on the dock and using a hook-like tool engages a loop on the upper end of the restraining member to move the restraining member upwardly. Then through rotation of the tool, the restraining member can be pivoted 90°, so that it extends outwardly away from the dock. The operator then permits the restraining member to fall by gravity until it engages the ICC bar.

After the loading operation has been completed, the operator, using the hook-like tool lifts the restraining member upwardly and then pivots the restraining member to the storage position where it will rest on the stop. With the restraining member released, the truck is then free to pull away from the dock.

The vehicle restraint of the invention provides a positive lock to the ICC bar or abutment on the vehicle to prevent the vehicle from accidentally pulling away from the dock. Further, the vehicle restraint is free to follow both upward and downward float of the truck bed, as cargo is removed or loaded onto the truck bed and this floating action is accomplished without the need of springs or other biasing means.

The vehicle restraint is of simple and inexpensive construction and can be utilized either with existing docks or in new installations.

As the stop, which is used to support the restraining member in the storage position, is spaced beneath the upper ends of the guide tracks, the restraining member can be released from the vehicle, even though the truck bed may have descended several inches during the loading operation.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
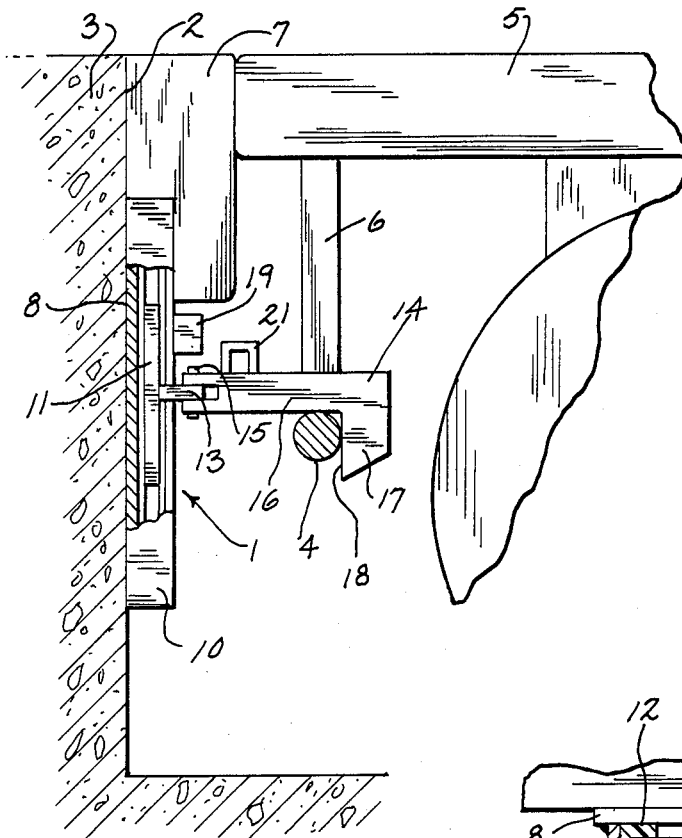
FIG. 1 is a side elevation showing the vehicle restraint of the invention as mounted on a loading dock and in engagement with the ICC bar on a truck.

The drawings illustrate a vehicle restraint 1, which is mounted on the front face 2 of a loading dock 3 and is adapted to engage an abutment, such as an ICC bar 4 which is located beneath the rear end of a truck bed 5. Supports or braces 6 connect ICC bar 4 with bed 5. The ICC bar 4 is a beam or bar designed to prevent underriding of an automobile in the event of a rear end collision.

Vehicle restraint 1 is located between a pair of bumpers 7 which are mounted in spaced relation on the front face of the dock and are positioned to be engaged by the rear end of the truck as the truck backs toward the loading dock.

In some installations, the upper surface of the dock 3 may include a pit or depression which houses an adjustable dock board that can be used to bridge the gap between the loading dock 3 and the bed 5 of the truck. However, it is contemplated that the vehicle restraint 1 of the invention can be used with or without a dock having a dockboard installation.

Vehicle restraint 1 includes a mounting plate 8 which is secured to the front face 2 of dock 3 by a plurality of conventional anchor bolts, not shown. A pair of tracks 10 are secured in spaced relation on mounting plate 1 and a slide plate 11 is mounted for vertical sliding movement within tracks 10. While guide tracks 10 are shown as being defined by angles, it is contemplated that the guide tracks may take other configurations. Generally U-shaped caps 12 formed of nylon, or other material having a low coefficient of friction, can be attached to the side edges of the slide plate 11 to aid in sliding movement.

Figure 2:
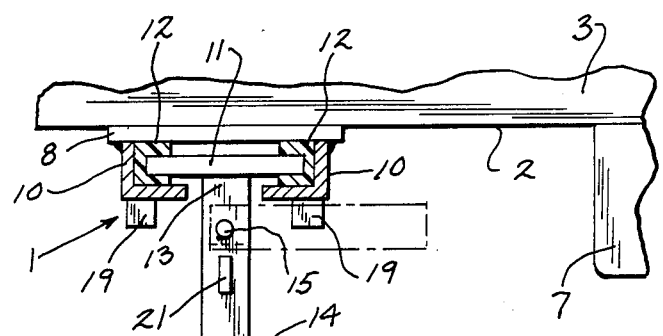
FIG. 2 is a top view of the vehicle restraint.
Figure 3:
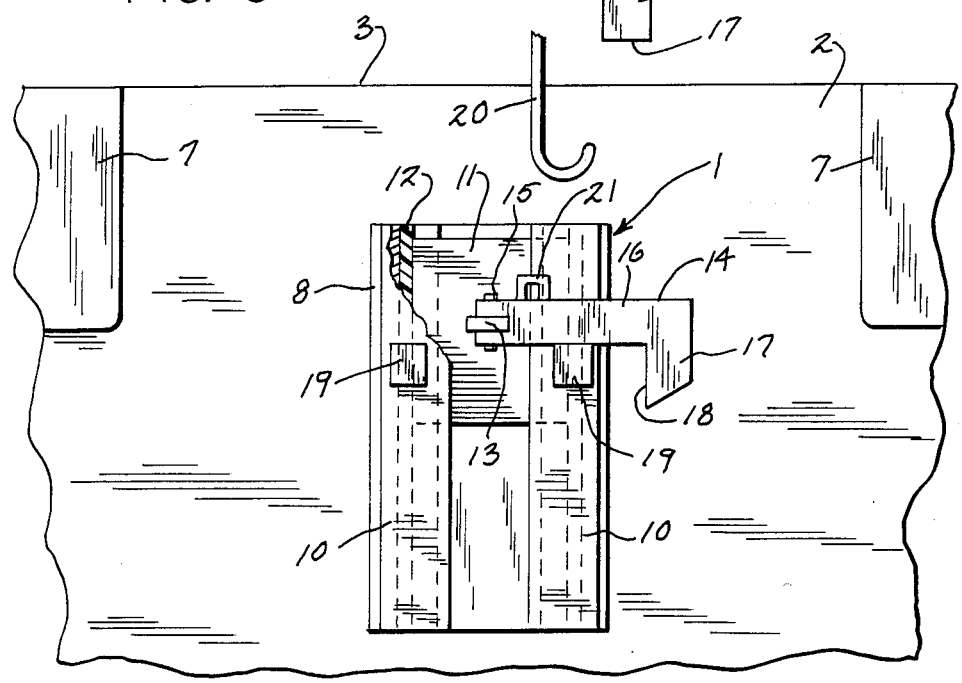
FIG. 3 is a front elevation of the vehicle restraint.

As best shown in FIG. 2, a bar or extension 13 extends outwardly from slide plate 11 through the gap between the guide tracks 10 and a restraining member 14, which can be in the form of a downwardly facing hook, is pivotally connected to extension 13 by a vertical pin or shaft 15. More particularly, the inner end of restraining member 14 is bifurcated and straddles the extension 13 and shaft 15 extends through aligned holes in the end of restraining member 14 and extension 13.

Restraining member 14 includes a generally straight inner section 16 and a downwardly extending outer section or tip 17, bordered by a generally vertical downwardly facing surface 18 which serves to engage and prevent the ICC bar 4 from being moved outwardly away from the dock, as shown in FIG. 1.

In use, the restraining member 14 is stored in a position generally parallel to the front face 2 of loading dock 3, as shown by the phantom lines in FIG. 2. The restraining member is held in this position by engagement with one of a pair of stops 19 which are mounted on the outer surfaces of the respective guide tracks 10. After a truck has pulled up to the dock for a loading operation and the bed 5 of the truck is in engagement with bumper 7, an operator, standing on the dock and using a hook-like tool 20 engages a loop 21 that extends upwardly from the inner section 16 and lifts the restraining member 14 to a location where the downwardly facing tip 17 is at a level above the ICC bar 4. The operator then rotates the restraining member 90° by twisting the hook-like tool until the restraining member faces outwardly from the dock, as shown in FIG. 2. Restraining member 14 is then permitted to drop by gravity until it engages the ICC bar, as shown in FIG. 1. In this position, the truck is prevented from accidentally pulling away from the dock during the loading operation.

During the loading operation, the truck bed may rise or fall as cargo is removed or loaded onto the truck bed. The restraining member 14 can follow both upward and downward float, due to the sliding connection of slide plate 11 with guide tracks 10, thus insuring that the restraining member will be maintained in engagement with the ICC bar regardless of vertical movement of the ICC bar during loading operation.

When the loading operation has been completed, the operator, using the hook-like tool 20, engages loop 21 and lifts the restraining member 14 until the downwardly facing tip 17 will clear the ICC bar. The operator then pivots the restraining member to a position generally parallel to the front face 2 and lowers the restraining member onto the stop block 19.

The vehicle restraint of the invention is a simple and inexpensive device that will positively lock the vehicle to the loading dock.

Due to the pivotal connection of the restraining member 14 to the slide 11, the restraining member can be released from engagement with the ICC bar regardless of the position of the truck bed.

Various modes of carrying out the invention are contemplated as being within the scope of the following claims particularly pointing out and distinctly claiming the subject matter which is regarded as the invention.

I claim:

1. A vehicle restraint for preventing accidental movement of a vehicle away from a fixed structure, comprising vertical guide means mounted on a vertical surface of said structure, a slide having a non-circular erase-section mounted for sliding vertical movement in said guide means and having a portion extending outwardly beyond said guide means, said slide being fixed against rotational movement relative to said guide means at all vertical positions of said slide, a restraining member pivotally connected to said portion about a generally vertical pivot axis, said restraining member being constructed and arranged to pivot relative to said slide from a first storage position located outwardly of said guide means and generally parallel to said structure to a second operating position where said restraining member extends outwardly from the structure, and means on said restraining member for receiving an implement to manually effect vertical or pivotal movement of said restraining member relative to said slide, said restraining member having a notch in its lower surface disposed to engage an abutment on said vehicle, engagement of said notch with said abutment preventing accidental movement of said vehicle away from said structure.

2. The vehicle restraint of claim 1, wherein said notch is bordered by a generally vertical surface spaced outwardly from said pivot axis when said restraining member is in said operating position.

3. The vehicle restraint of claim 1, and including stop means fixed in relation to said guide means and disposed to be engaged by said restraining member when said restraining member is in said first position to hold said restraining member in said first position.

4. The vehicle restraint of claim 3, wherein said stop means is spaced beneath the upper end of said guide means.

5. The vehicle restraint of claim 1, wherein said guide means comprises a pair of spaced guide tracks, said portion extending between said guide tracks.

6. A vehicle restraint for preventing accidental movement of a truck away from a loading dock during a loading operation, comprising a pair of spaced vertical guide tracks mounted on a front face of a dock, a slide having a generally rectangular cross sectional configuration mounted for sliding movement in said guide tracks and having a portion extending outwardly between said spaced guide tracks, restraining means having a generally horizontal inner section and having an outer section extending downwardly from the outer end of said inner section, and vertical pivot means for pivotally connecting the inner end of said inner section to said portion, whereby said restraining means can be freely pivoted relative to said slide from a first storage position located outwardly of said guide tracks and generally parallel to said front face to a second operating position where said restraining means extends outwardly from said face, said restraining means disposed to be lowered by gravity to effect engagement of said inner section with an ICC bar of said truck, said downwardly extending outer section being constructed and arranged to prevent movement of said truck away from said loading dock when said inner section is engaged with said ICC bar.

7. The vehicle restraint of claim 6, and including an abutment disposed on the outer surface of one of said guide tracks and disposed to support said restraining means in the storage position, said abutment being spaced a substantial distance beneath the upper ends of said guide tracks.

* * * * *

UNITED STATES PATENT AND TRADEMARK OFFICE
CERTIFICATE OF CORRECTION

PATENT NO.  : 4,728,242
DATED       : March 1, 1988
INVENTOR(S) : KJELL I. ERLANDSSON It is certified that error appears in the above-identified patent and that said Letters Patent is hereby corrected as shown below:

Col. 1, Line 23, CLAIM 1, Cancel "erase-section" and substitute therefor ---cross-section---

Signed and Sealed this

Twenty-ninth Day of November, 1988

Attest:

DONALD J. QUIGG

*Attesting Officer*   *Commissioner of Patents and Trademarks*